United States Patent
Fauriol et al.

(10) Patent No.: US 12,122,329 B2
(45) Date of Patent: Oct. 22, 2024

(54) CLIP FOR ATTACHING A FLUID LINE TO AN ARM

(71) Applicant: VALEO SYSTEMES D'ESSUYAGE, La Verriere (FR)

(72) Inventors: Quentin Fauriol, La Verriere (FR); Cyrille Girodot, La Verriere (FR); Nicolas Kuchly, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 18/006,305

(22) PCT Filed: Jul. 13, 2021

(86) PCT No.: PCT/EP2021/069536
§ 371 (c)(1),
(2) Date: Jan. 20, 2023

(87) PCT Pub. No.: WO2022/023031
PCT Pub. Date: Feb. 3, 2022

(65) Prior Publication Data
US 2023/0294639 A1   Sep. 21, 2023

(30) Foreign Application Priority Data
Jul. 27, 2020 (FR) ........................ 2007900

(51) Int. Cl.
B60S 1/34          (2006.01)
(52) U.S. Cl.
CPC .................. B60S 1/3415 (2013.01)

(58) Field of Classification Search
CPC ............ B60S 1/3415; B60S 1/522; F16L 3/13
See application file for complete search history.

(56) References Cited

U.S. PATENT DOCUMENTS 2,738,486 A * 3/1956 Wadsworth .......... H01H 85/202
                                                   439/830
4,840,334 A * 6/1989 Kikuchi .................... F16L 3/13
                                                    24/453
(Continued)

FOREIGN PATENT DOCUMENTS

DE    102014214109 A1    1/2016
DE    102015224620 A1    6/2017
(Continued)

OTHER PUBLICATIONS

FR-2758781-A1 translation (Year: 1999).*
(Continued)

*Primary Examiner* — Michael W Hotchkiss
(74) *Attorney, Agent, or Firm* — Valeo Systemes d'Essuyage

(57) ABSTRACT

The present invention relates to a clip for attaching a fluid line to a wiper arm of a spraying device of a motor vehicle, the clip having a general V shape, the base of the V forming a housing for a fluid line portion, and comprising a first and a second retaining arm located on the first and the second ends of the V-shape and extending towards each other, the retaining arms being asymmetrical in an axial direction intended to be parallel to the fluid line such that the space between the two retaining arms forms an opening having a divergent shape in the axial direction.

10 Claims, 3 Drawing Sheets

(56) References Cited

U.S. PATENT DOCUMENTS

| | | | | | |
|---|---|---|---|---|---|
| 5,129,607 | A | * | 7/1992 | Satoh | F16L 3/13 248/74.2 |
| 5,327,614 | A | * | 7/1994 | Egner-Walter | B60S 1/3415 15/250.07 |
| 5,391,098 | A | * | 2/1995 | Ohashi | H01H 85/202 439/78 |
| 5,724,699 | A | * | 3/1998 | Bexten | B60S 1/32 15/250.04 |
| 5,842,251 | A | * | 12/1998 | LeFran.cedilla.ois | B60S 1/3497 15/250.04 |
| 5,846,017 | A | * | 12/1998 | Meyer | F16L 3/13 24/297 |
| 5,987,710 | A | * | 11/1999 | Paul | F16G 11/103 24/130 |
| 6,408,492 | B1 | * | 6/2002 | Sparks | A01K 97/08 24/336 |
| 6,934,992 | B2 | * | 8/2005 | Sato | B60S 1/522 15/250.04 |
| D570,207 | S | * | 6/2008 | Cox | D8/396 |
| 8,882,059 | B2 | * | 11/2014 | Schmidt | F16L 3/1041 248/65 |
| 9,707,936 | B2 | * | 7/2017 | Bousset | B60S 1/522 |
| 10,125,897 | B2 | * | 11/2018 | Schmidt | F16L 3/1041 |
| 10,272,878 | B2 | * | 4/2019 | Horvath | B60S 1/40 |
| 10,759,390 | B2 | * | 9/2020 | Rapp | F16L 3/1075 |
| 10,955,070 | B2 | * | 3/2021 | Bernstetter | B60R 16/0215 |
| 11,305,735 | B2 | * | 4/2022 | Kraemer | B60S 1/522 |

FOREIGN PATENT DOCUMENTS

| | | | | |
|---|---|---|---|---|
| EP | 2813402 | A1 | | 12/2014 |
| EP | 3415380 | A1 | | 12/2018 |
| FR | 2758781 | A1 | * | 7/1998 ............. B60S 1/522 |
| GB | 2385513 | A | * | 8/2003 ................. B60S 1/32 |
| JP | 2006007971 | A | | 1/2006 |

OTHER PUBLICATIONS

European Patent Office, International Search Report (with English translation) and Written Opinion of corresponding International Application No. PCT/EP2021/069536, dated Sep. 20, 2021.

* cited by examiner

CLIP FOR ATTACHING A FLUID LINE TO AN ARM

TECHNICAL FIELD

The present invention relates to the field of cleaning liquid spraying systems for motor vehicles, and in particular to the washing systems comprising spray nozzles on the wiper arms on which the wiper blades are disposed, and/or on the wiper blades themselves.

BACKGROUND OF THE INVENTION

Spraying cleaning liquid at the wiper arms and/or blades involves conveying the cleaning liquid to the spray nozzles. This conveyance is realized by pipes, also referred to as hoses, inside which the washing liquid circulates. The propulsion of the cleaning liquid in the pipes is realized, for example, by a pump of the cleaning system, the pump being configured to pump the cleaning liquid from a reservoir to the spray nozzles.

The pipes should thus be attached to the wiper arms. To that end, clips which can be disposed evenly along the pipe and the wiper arm exist. However, the clips of the prior art often have certain drawbacks, such as mounting which is awkward and/or requires a lengthy period of time, hindering the pipe when being mounted on the wiper arm.

SUMMARY OF THE INVENTION

It is therefore necessary to find a solution that makes it possible to facilitate the attachment of a pipe to a wiper arm.

To that end, what it proposed is a clip for attaching a fluidic pipe to a wiper arm of a spraying system for a motor vehicle, said clip having the overall shape of a V, the base of the V forming a receptacle for a portion of the fluidic pipe and comprising a first holding arm and a second holding arm that are located at the first end and the second end of the V shape and extend toward one another, said holding arms being asymmetrical in an axial direction intended to be parallel to the fluidic pipe such that the space between the two holding arms forms an opening having a divergent shape in the axial direction.

According to one aspect of the present invention, the end of the holding arms is rectilinear and has an angle of inclination of between 5 and 10° with the axial direction.

According to another aspect of the present invention, the distance between the holding arms is between 90% and 110% of the width of the wiper arm at their maximum spacing.

According to another aspect of the present invention, the distance between the holding arms is between 70% and 90% of the width of the wiper arm at their minimum spacing.

According to another aspect of the present invention, the holding arms have a beveled shape on their outer side to facilitate the insertion of the clip on the wiper arm.

According to another aspect of the present invention, the angle of the beveled shape is between 15 and 20°.

According to another aspect of the present invention, the overall V shape has rounded angles.

According to another aspect of the present invention, the clip comprises two protuberances that are disposed respectively on the two inner walls of the V shape and delimit the receptacle intended to receive the portion of the fluidic pipe.

According to another aspect of the present invention, the protuberances extend from the inner walls of the V shape at an angle of between 90 and 120° and have a height of between 0.1 and 0.3 times the diameter of the fluidic pipe.

According to another aspect of the present invention, the clip is made of plastics material, in particular ethylene propylene.

The present invention also relates to a method for attaching a fluidic pipe to a wiper arm of a spraying system for a motor vehicle, said method comprising the following steps:
  providing at least one clip as described above,
  placing a portion of a fluidic pipe in a receptacle of the at least one clip, in particular either by spacing apart the ends of the V shape or by sliding the fluidic pipe into the bottom of the V shape,
  placing the at least one clip on the wiper arm by placing the holding arms against the wiper arm and by pushing the clip toward the wiper arm to make it possible to insert a portion of the wiper arm inside the V shape.

BRIEF DESCRIPTION OF DRAWINGS

Further features and advantages of the invention will become more clearly apparent from reading the following description, which is given by way of illustrative and non-limiting example, and from the appended drawings, in which.

DETAILED DESCRIPTION OF THE INVENTION

In these figures, elements that are identical bear the same reference signs.

The following embodiments are examples. Although the description refers to one or more embodiments, this does not necessarily mean that each reference relates to the same embodiment, or that the features apply only to one embodiment. Individual features of different embodiments may also be combined or interchanged to provide other embodiments.

Figure 3:
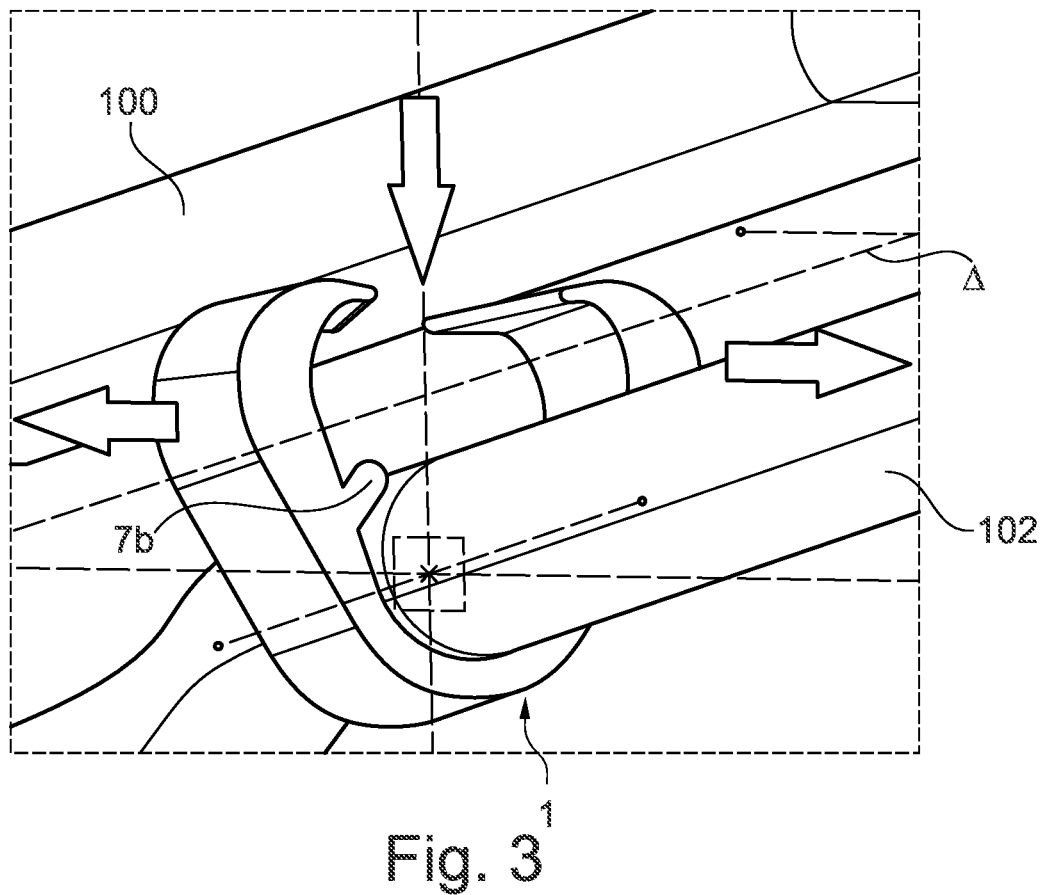
FIG. 3 shows a schematic view, in perspective, of the positioning of a clip on a wiper arm.

Implementations and embodiments of the invention relate to a clip 1 for a liquid spraying system, notably for a motor vehicle. As shown in FIG. 3, the clip 1 is intended to enable attachment to a wiper arm 100 of a fluidic pipe 102 for supplying washing liquid at a spray nozzle (not shown) disposed on the wiper arm 100 and/or on the wiper blade mounted on said wiper arm 100.

Figure 1:
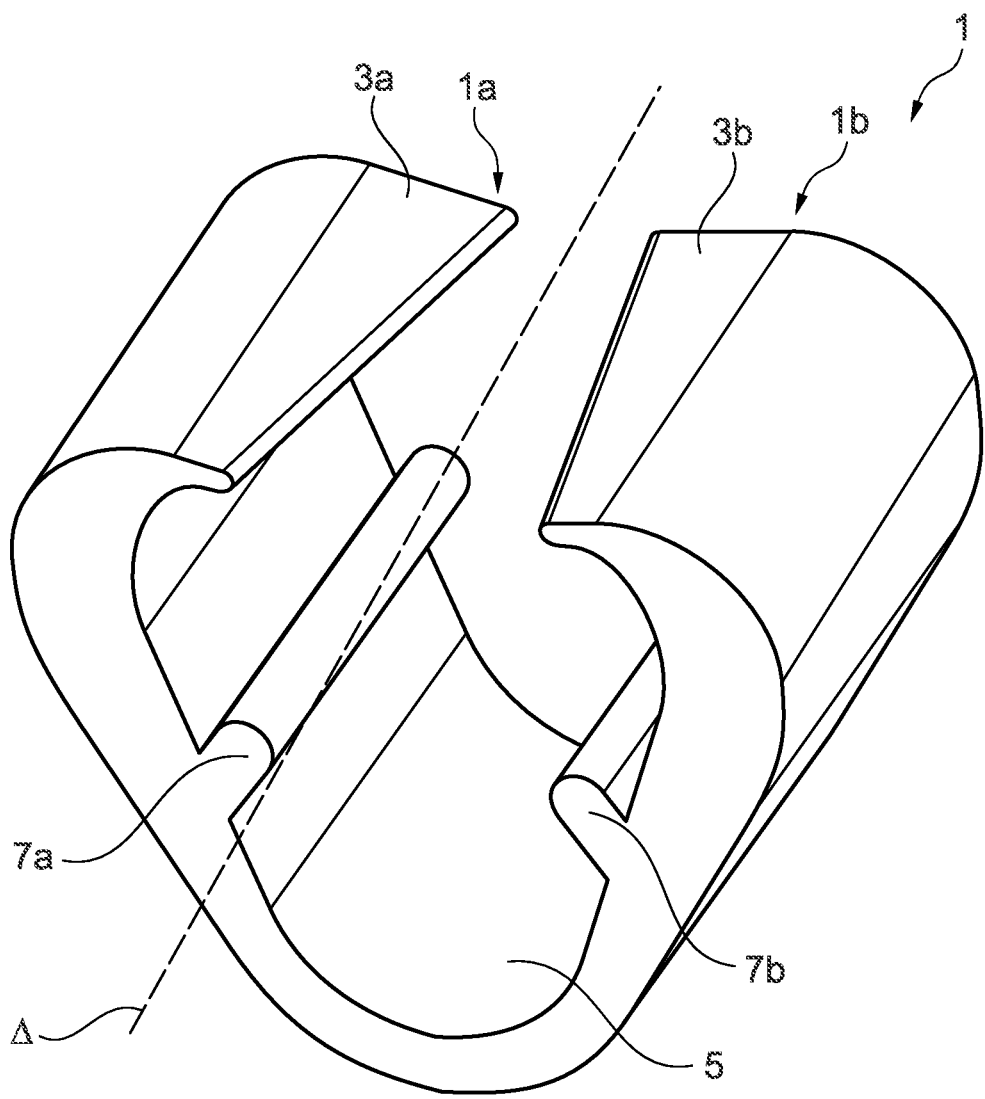
FIG. 1 shows a schematic view, in perspective, of an exemplary embodiment of a clip according to the present invention.
Figure 2:
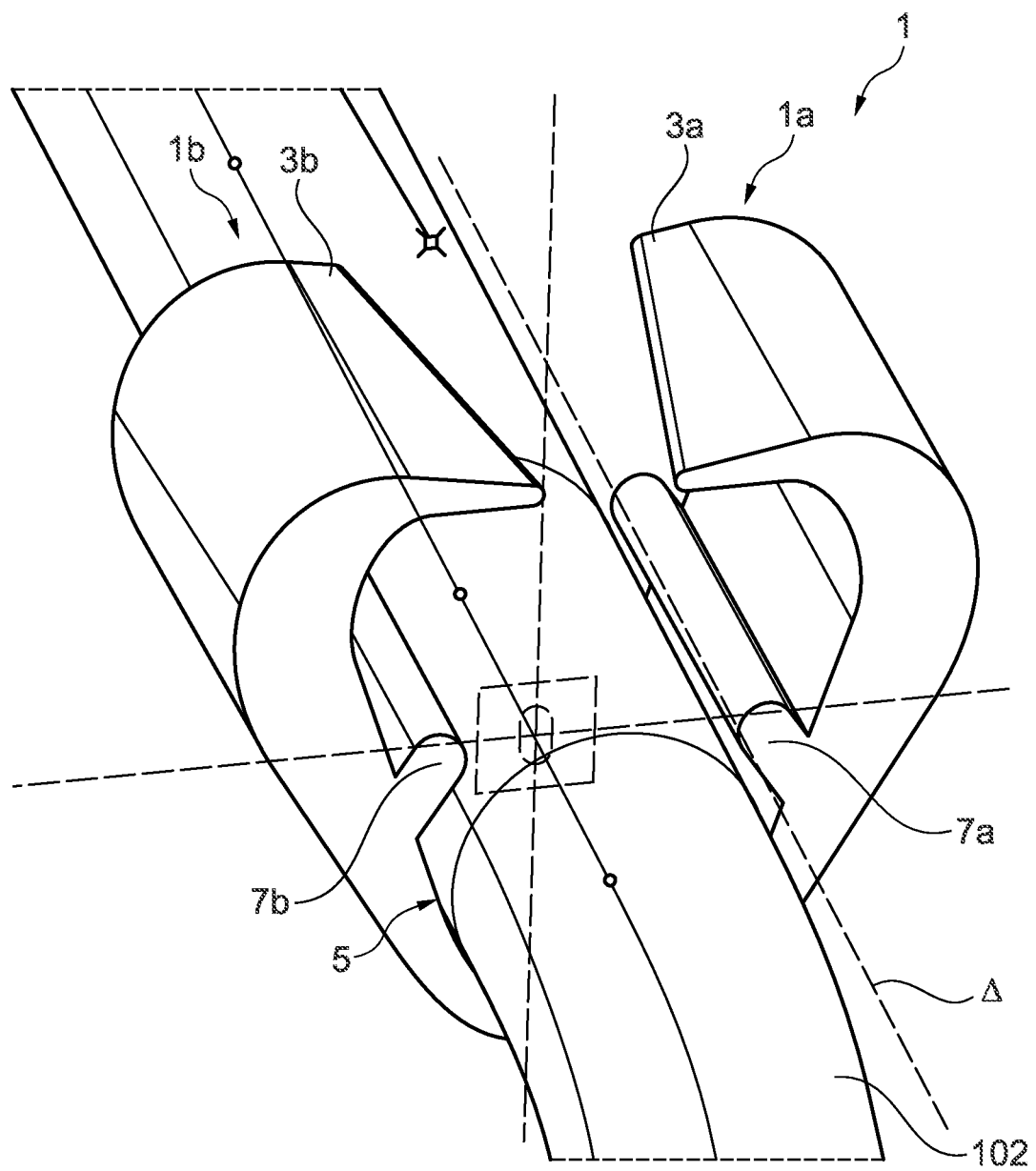
FIG. 2 shows a schematic view, in perspective, of a clip positioned around a portion of a fluidic pipe.

FIG. 1 shows a perspective view of a clip 1 with the overall shape of a V comprising a first holding arm 3*a* and a second holding arm 3*b* that are located respectively at the first end 1*a* and the second end 1*b* of the V shape and extend toward one another. The space between the two holding arms 3*a* and 3*b* forms an opening having a divergent shape in the axial direction such that the holding arms 3*a*, 3*b* are asymmetrical in this axial direction. The axial direction, shown by an axis A in the figures, corresponds to a direction parallel to the direction of the fluidic pipe 102 or of the wiper arm 100 when the clip 1 is mounted on a portion of the fluidic pipe 102 and/or of the wiper arm 100. In the example of FIGS. 1 to 3, the ends of the holding arms 3*a*, 3*b* are rectilinear and have an angle of between 5 and 10° with respect to the axial direction, but it is also possible to use other, non-rectilinear shapes, albeit ones having a divergence, for example curved and notably convex shapes. The divergent shape formed by the space between the holding arms 3a, 3b makes it possible to facilitate the mounting of the clip 1 on the wiper arm 100 and also makes it possible to properly center the clip 1. The distance between the holding arms 3a, 3b at their maximum spacing is, for example, between 90% and 110% of the width of the wiper arm 100 to make it possible to insert and position the clip 1 easily on the wiper arm 100, and the distance between the holding arms 3a, 3b at their minimum spacing is, for example, between 70% and 90% of the width of the wiper arm 100 to make it possible to reliably attach the clip 1 to the wiper arm 100.

The holding arms 3a, 3b may also have a beveled shape on their outer side to facilitate the insertion of the clip 1 on the wiper arm 100. The angle of the beveled shape is, for example, between 15 and 20°.

The base of the V shape of the clip 1 forms a receptacle 5 for a portion of the fluidic pipe 102. Protuberances 7a, 7b may be formed on the inner walls of the V shape to delimit this receptacle and avoid any interference of the fluidic pipe 102 when the clip 1 is being mounted on the wiper arm 100. The protuberances 7a, 7b extend for example at an angle of between 90 and 120° (from the walls of the V shape) and have for example a height of between 0.1 and 0.3 times the diameter of the fluidic pipe 102 so as to make it possible to easily insert a portion of the fluidic pipe 102 into the receptacle 5 whilst still ensuring this portion is retained in the receptacle 5. The end of the protuberances 7a, 7b may have a rounded shape. FIG. 2 shows a schematic view in which a portion of the fluidic pipe 102 is positioned in the receptacle 5.

Depending on the requirements, the protuberances 7a and 7b either enable the sliding of the fluidic pipe or the clamping of the fluidic pipe, which will make it possible to keep the clasp in place on said fluidic pipe.

The various angles of the clip 1 and notably the angles of the V shape may be rounded, as in the embodiment of FIGS. 1 to 3. Moreover, the thicknesses of the walls of the clip 1 may vary. The base of the V shape may have a wall which is thinner than the two lateral walls so as to afford an elasticity that makes it possible to be able to easily space apart the two ends of the V shape. The holding arms 3a, 3b may also have a small thickness to facilitate positioning on the wiper arm 100.

With preference, the clip 1 is made of plastics material, notably ethylene propylene.

Figure 4:
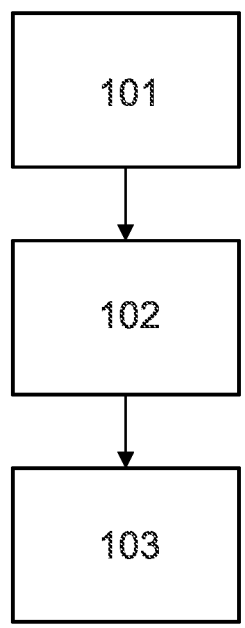
FIG. 4 shows a flowchart of the various steps of a method for attaching a fluidic pipe to a wiper arm.

The present invention also relates to a method for attaching a fluidic pipe 102 to a wiper arm 100 of a spraying system for a motor vehicle using one or more clips 1 as described above. FIG. 4 shows the various steps of the method.

The first step 101 concerns providing the one or more clips.

The second step 102 concerns the placement of a portion of a fluidic pipe 102 in the receptacle 5 of the clip 1 as described above, in particular by spacing apart the ends of the V shape or by sliding the fluidic pipe into the V shape. The ends of the V shape may be spaced apart by positioning the clip 1 such that the opening of the clip 1 located between the holding arms 3a, 3b comes into contact with the fluidic pipe 102, and then by pressing on the outer part of the base of the V shape of the clip 1, in the direction of the fluidic pipe 102, so as to make it possible to insert the fluidic pipe 102 into the clip 1 and in particular into the receptacle 5. The second step 102 ends when the portion of the fluidic pipe 102 is positioned in the receptacle 5, as shown in FIG. 2.

The third step 103 concerns the placement of the clip 1 on the wiper arm 100 by placing the holding arms 3a, 3b against the wiper arm 100 and by pushing the clip 1 toward the wiper arm 100 to enable the insertion of a portion of the wiper arm 100 inside the V shape, that is to say between the receptacle 5 and the holding arms 3a, 3b, after the ends of the clip 1 have been spaced apart, as shown by the arrows in FIG. 3.

If the attachment requires multiple clips 1, the steps 102 and 103 can be repeated for each clip 1. The order of these steps can vary; for example, it is possible to dispose all the clips 1 on the hydraulic pipe 102 and then to attach the various clips 1 to the wiper arm 100 or to position the clips 1 one after another on the hydraulic pipe 102 and the wiper arm 100.

What is claimed is:

1. A clip for attaching a fluidic pipe to a wiper arm of a spraying system for a motor vehicle, comprising:
   said clip having a V shape overall;
   a base of the V shape forming a receptacle for a portion of a fluidic pipe and including
   a first holding arm and a second holding arm that are located at a first end and a second end of the V shape, which extend toward one another;
   said holding arms being asymmetrical in an axial direction and configured to be parallel with the fluidic pipe such that a space between said holding arms form an opening with a divergent shape in the axial direction;
   wherein a protuberance extends from an inner wall of each holding arm of the V shape, where each protuberance is oriented at an angle of between 90 degrees and 120 degrees relative to a longitudinal length of each associated holding arm; and
   wherein each protuberance has a height of between 0.1 and 0.3 times a diameter of the fluidic pipe.

2. The clip of claim 1, wherein at least one end of the holding arms is rectilinear and has an angle of inclination of between 5 and 10 degrees with the axial direction.

3. The clip of claim 1, wherein a distance between the holding arms is between 90% and 110% of a width of the wiper arm at a maximum spacing of the holding arms.

4. The clip of claim 1, wherein a distance between the holding arms is between 70% and 90% of a width of the wiper arm at a minimum spacing of the holding arms.

5. The clip of claim 1, wherein the overall V shape has rounded angles.

6. The clip of claim 1, wherein said protuberances that are disposed along the opposing inner walls of the V shape delimit the receptacle that is intended to receive the portion of the fluidic pipe.

7. A method for attaching a fluidic pipe to a wiper arm of a spraying system for a motor vehicle, said method comprising the following steps:
   Providing at least one clip as claimed in claim 1;
   Placing a portion of a fluidic pipe in a receptacle of the at least one clip, in particular either by spacing apart the ends of the V shape or by sliding the fluidic pipe into a bottom of the V shape; and
   Placing the at least one clip on the wiper arm by placing the holding arms against the wiper arm and by pushing the clip toward the wiper arm to make it possible to insert a portion of the wiper arm inside the V shape.

8. The clip of claim 1, wherein the holding arms have a beveled shape on their outer side to facilitate the insertion of the clip on the wiper arm.

9. The clip of claim 8, wherein an angle of the beveled shape is between 15 and 20 degrees.

10. A clip for attaching a fluidic pipe to a wiper arm of a spraying system for a motor vehicle, comprising:
- said clip having a V-shape overall;
- a base of the V-shape forming a receptacle for a portion of a fluidic pipe and including
    - a first holding arm and a second holding arm that are located at a first end and a second end of the V-shape, which extend toward one another;
    - said holding arms being asymmetrical in an axial direction and configured to be parallel with the fluidic pipe such that the a space between said holding arms forms an opening with a divergent shape in the axial direction;
- wherein a protuberance extends from an opposing inner wall of each holding arm of the V-shape, and wherein each protuberance has a height of between 0.1 and 0.3 times a diameter of the fluidic pipe; and
- wherein a distance between the holding arms is between 70% and 90% of a width of the wiper arm at a minimum spacing of said holding arms.

* * * * *